United States Patent [19]

Torii et al.

[11] Patent Number: 5,312,220
[45] Date of Patent: May 17, 1994

[54] INDUSTRIAL ROBOT WITH WORKPIECE HANDLING MEANS FOR ATTACHING A WORKPIECE TO AND REMOVING A WORKPIECE FROM A MACHINE TOOL

[75] Inventors: Nobutoshi Torii, Hachioji; Ryo Nihei, Yamanashi, both of Japan

[73] Assignee: Fanuc Ltd., Yamanashi, Japan

[21] Appl. No.: 867,102

[22] PCT Filed: Nov. 7, 1991

[86] PCT No.: PCT/JP91/01530

§ 371 Date: Jul. 1, 1992

§ 102(e) Date: Jul. 1, 1992

[87] PCT Pub. No.: WO92/08582

PCT Pub. Date: May 29, 1992

[30] Foreign Application Priority Data

Nov. 15, 1990 [JP] Japan .................. 2-307271

[51] Int. Cl.⁵ .............................................. B25J 9/02
[52] U.S. Cl. ............................................ 414/736; 901/18; 901/26
[58] Field of Search ............ 414/736, 728, 739, 742; 901/18, 23, 26

[56] References Cited

U.S. PATENT DOCUMENTS 3,984,009 10/1976 Holroyd .................. 901/18 X
4,832,563 5/1989 Massmann .................. 414/736 X

FOREIGN PATENT DOCUMENTS 58-28484 2/1983 Japan .
58-114872 7/1983 Japan .
59-64286 4/1984 Japan .
62-32790 8/1987 Japan .
729028 4/1980 U.S.S.R. ................. 901/18

Primary Examiner—Michael S. Huppert
Assistant Examiner—Donald W. Underwood
Attorney, Agent, or Firm—Nikaido, Marmelstein, Murray & Oram

[57] ABSTRACT

An industrial robot is provided with robot hands (44, 46) capable of being moved by turning actions between a workpiece handling position to which a workpiece is transported and at which the workpiece is fed to the chucking device (10) of a machine tool and a standby position away from the workpiece handling position. The robot also incorporates a robot hand (42) capable of being turned in a plane at the workpiece handling position to align a workpiece with the chucking device (10) of the machine tool, and a pneumatic cylinder actuator (48) capable of linearly moving the robot hand (42) toward the chucking device (10) and away from the chucking device (10) so as to remove a workpiece from the chucking device (10). The industrial robot can be readily fixed to the bed of the machine tool by bolts, for example.

4 Claims, 2 Drawing Sheets

INDUSTRIAL ROBOT WITH WORKPIECE HANDLING MEANS FOR ATTACHING A WORKPIECE TO AND REMOVING A WORKPIECE FROM A MACHINE TOOL

TECHNICAL FIELD

The present invention relates to an industrial robot provided with a workpiece handling means capable of automatically carrying out operations for attaching a workpiece to the chucking device of a machine tool, particularly to the chucking device of a lathe, removing a workpiece from the chucking device, and transporting a workpiece according to instructions given thereto by a robot controller.

BACKGROUND ART

As is generally known, industrial robots have been used for attaching a workpiece to and removing a workpiece from machine tools. Industrial robots for such purposes include a gantry robot provided with a workpiece feed means spanning over a machine tool, a loading robot designed specially for a machine tool, and a general purpose articulated robot provided with robot arms having a plurality of degrees of freedom of motion, a robot wrist, and a robot hand.

The functional robot mechanism of the gantry robot, in general, has a large construction, and is not necessarily suitable for use in combination with a lathe. The loading robot is designed specially for a specific machine tool, and is unable to be applied generally to a desired machine tool. Teaching the articulated robot a series of robot actions, including feeding a workpiece and transporting the same, requires a complicated teaching procedure because the articulated robot has many axes about which the component parts operate, and it is difficult to install the articulated robot in combination with a machine tool. Thus the articulated robot is not satisfactory in this application.

SUMMARY OF THE INVENTION

Accordingly, an object of the present invention is to provide an industrial robot capable of being installed on the bed of a machine tool, particularly a lathe, capable of being taught robot actions for attaching a workpiece to the chucking device of the lathe, removing a workpiece from the chucking device, and transporting a workpiece, by a simple teaching procedure. The robot of the present invention also has compact construction, to thus solve the problems encountered by conventional industrial robots.

In one aspect of the present invention, an industrial robot provided with a workpiece handling means for attaching a workpiece to and removing the same from the chucking device of a machine tool, according to instructions prestored in a robot controller by teaching, compromises:

a robot body means provided with a casing having a base means to be attached to a predetermined part of the machine tool, and two rotation drive means;

a first rotational output shaft projecting from the robot body means and connected to one of the two rotation drive means;

a rotational transmission shaft connected to the other rotation drive means and extended through the first rotational output shaft;

a second rotational output shaft interlocked with the rotational transmission shaft by a gear mechanism and extended perpendicularly to the first rotational output shaft;

a robot shoulder means holding the second rotational output shaft, connected to the first rotational output shaft and capable of stopping at a predetermined workpiece handling position, at a standby position away from the workpiece handling position, and at an optional position between the workpiece handling position and the standby position;

a suspended robot arm means having a base end connected to the second rotational output shaft so as to be able to move linearly in a predetermined range along the axis of the second rotational output shaft within the robot shoulder means; and a plurality of workpiece gripping robot hand means attached to the front end of the robot arm means, and capable of being alternately located at a position opposite to the chucking device of the machine tool by the rotational action of the second rotational output shaft, when the robot shoulder means is located at the workpiece handling position.

BRIEF DESCRIPTION OF THE DRAWINGS

The above and other objects, features and advantages of the present invention will become more apparent from the following description taken in connection with the accompanying drawings, in which.

BEST MODE OF CARRYING OUT THE INVENTION

Figure 1:
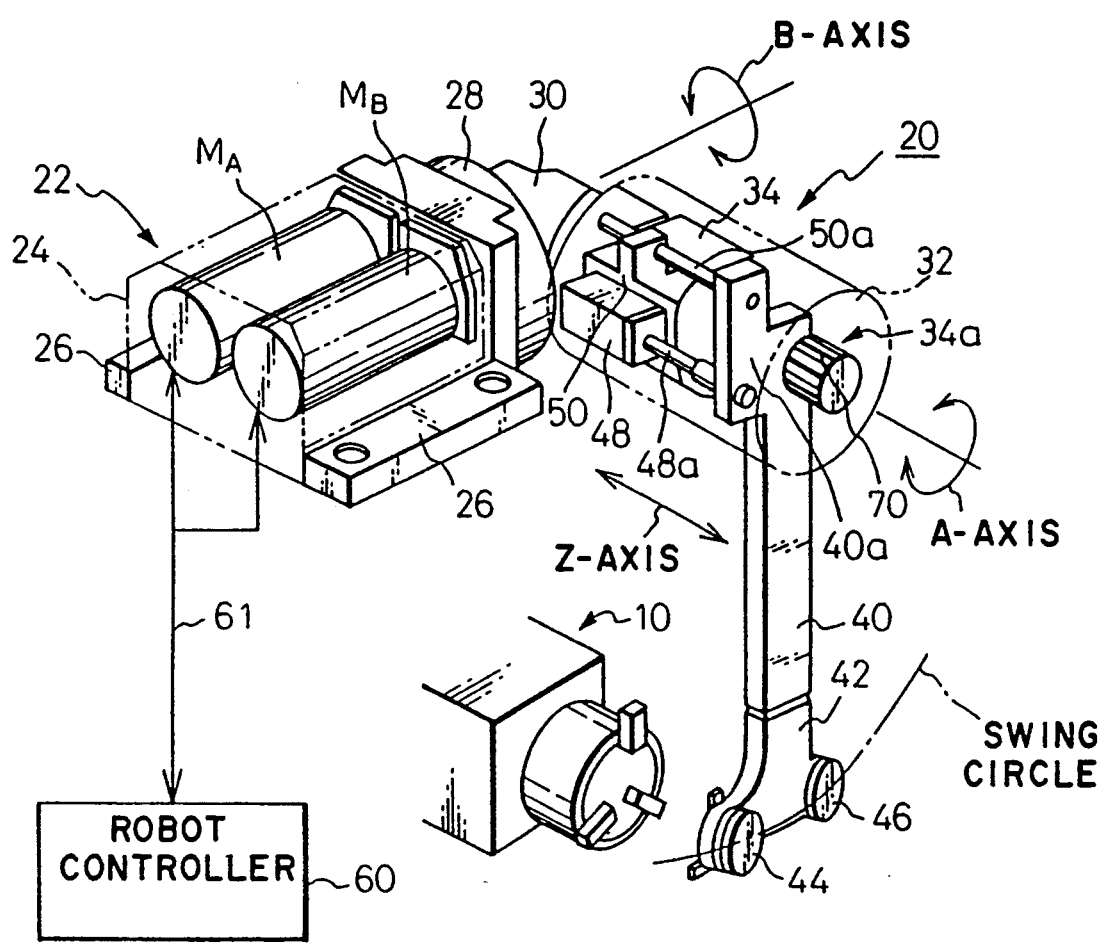
FIG. 1 is a general perspective view of an industrial robot in a preferred embodiment according to the present invention, and provided with a workpiece handling means for attaching a workpiece to and removing the same from a machine tool.

Referring to FIG. 1, an industrial robot 20 provided with a work handling means is a robot having a compact construction capable of being installed on the bed, not shown, of a machine tool. The industrial robot 20 operates, according to a control program prestored in a robot controller 60 by teaching, to attach a workpiece to the chucking device 10 of the machine tool, particularly a lathe, and to remove a machined workpiece from the chucking device 10.

The robot 20 has a robot body 22 provided with a casing 24 having bases 26 to be attached to the bed of the machine tool on opposite sides thereof. Two electric motors $M_A$ and $M_B$ (rotation drive means), such as electric servomotors, are accommodated in a parallel arrangement in the casing 24 with the output shafts thereof extended in parallel to each other, and are connected to the robot controller 60 by signal lines 61. The rotational output shafts of the electric motors $M_A$ and $M_B$ project outside from one end of the casing 24, and drive the load for rotation through a selected angle by predetermined torques through gear trains built in a gear case 28.

A coaxial type reduction gear 30 reduces an input rotating speed, i.e., the output rotating speed of the electric motor $M_B$ transmitted thereto through the gear train, to a first rotating speed at which the output shaft 30a (FIG. 2) of the reduction gear 30 rotates about a first axis of rotation. The rotation of the output shaft 30a of the reduction gear 30 about the first axis B of rotation will be hereafter designated the "B-axis rotation".

Figure 2:
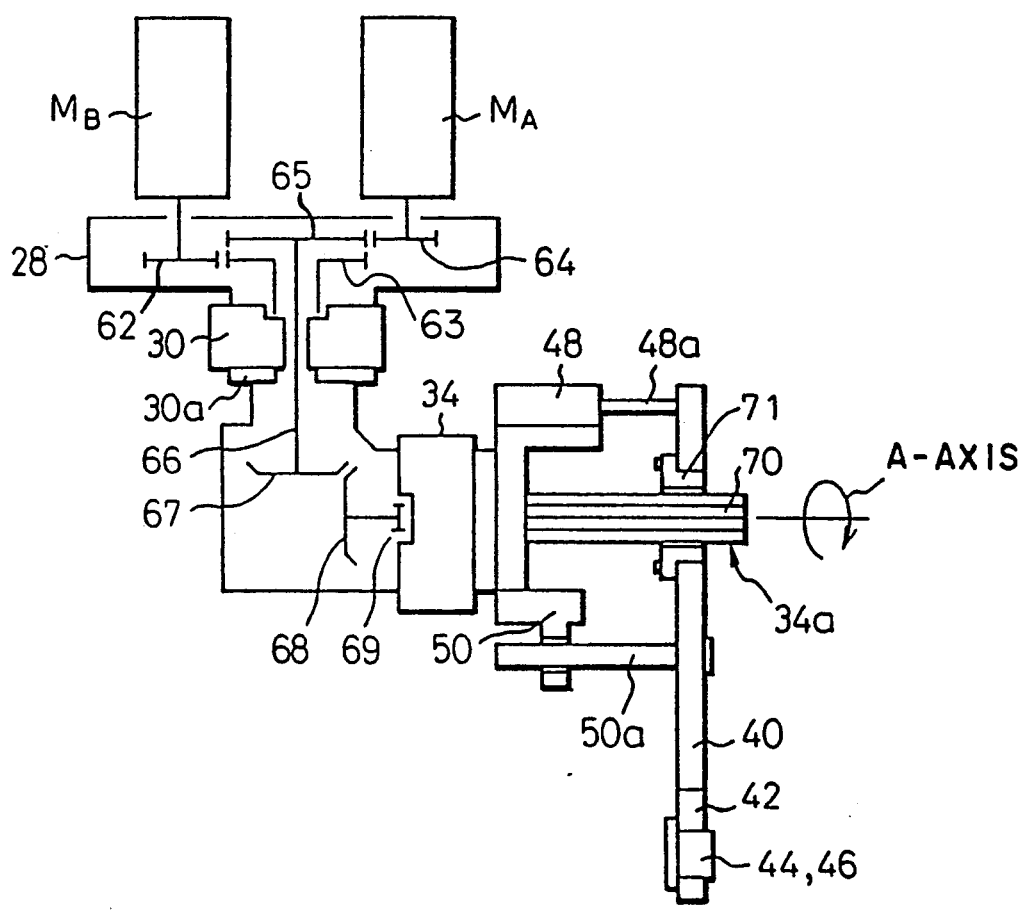
FIG. 2 is a schematic view of assistance in explaining the functional mechanisms of the industrial robot of FIG. 1.

As shown in FIGS. 1 and 2, the other electric motor $M_A$ is connected through the gear train of the gear case 28 to a transmission shaft 66, described later, coaxially extending through the above-mentioned reduction gear 30. The front portion of the transmission shaft 66 is extended into a robot shoulder 32 to drive the input shaft of a coaxial reduction gear 34 built in the robot shoulder 32 through a bevel gear mechanism. The output shaft 34a of the reduction gear 34 rotates about a second axis A of rotation, i.e., an axis perpendicular to the axis B of the B-axis rotation. Such a rotation of the output shaft 34a about the second axis A of rotation will be hereafter designated the "A-axis rotation".

A robot arm 40 is attached at the upper end thereof to the output shaft 34a. Preferably, the robot arm 40 is suspended in a pendulum fashion from the output shaft 34a when the two axes of the first and second output rotations (the latter is the axis of the output shaft 34a) are arranged to be extended horizontally. A robot hand unit 42 having a pair of gripping hands 44 and 46 is detachably attached to the extremity of the robot arm 40. The gripping hands 44 and 46 are robot hands each having a construction similar to that of a commercial chucking device provided with three adjustable jaws capable of being moved radially inward for a chucking action and radially outward for a releasing action. The gripping hands 44 and 46 are operated for the chucking and releasing actions by the hydraulic pressure of a working fluid supplied thereto via the robot arm 40.

The robot arm 40 is mounted at the rear end thereof on the extremity of the output shaft 34a within the robot shoulder 32, to be able to swing together with the output shaft 34a and to be able to move along the axis of the output shaft 34a; that is, a base 40a formed at the rear end of the robot arm 40 is joined to the output shaft 34a of the reduction gear 34 by a ball-and-spline mechanism for a swing motion together with the output shaft 34a and for a displacement along the axis of the output shaft 34a relative to the output shaft 34a. The operating end of the output shaft 48a of a pneumatic cylinder actuator 48, i.e., a linear-motion drive means, is joined to the base 40a, and a guide rod 50a having one end joined to the base 40a is guided by a guide 50 disposed near the pneumatic cylinder actuator 48, to guide the axial, linear movement of the robot hand 40 along the axis of the output shaft 34a.

Referring now to FIG. 2, a pinion 62 attached to the extremity of the output shaft of the electric motor $M_B$ is engaged with an intermediate gear 63 to thus transmit the output rotation of the electric motor $M_B$ through the intermediate gear 63 to the reduction gear 30. The output shaft 30a of the reduction gear 30 rotates for the first output rotation at an output rotating speed lower than the input rotating speed, i.e., the B-axis rotation. The robot shoulder 32, fastened by fastening means such as bolts to the output shaft 30a of the reduction gear 30, is driven for a B-axis rotation together with the robot arm 40.

Further, a pinion 64 attached to the output shaft of the electric motor $M_A$ is engaged with an intermediate gear 65, to thus transmit the rotation of the output shaft of the electric motor $M_A$ through the transmission shaft 66, a bevel gear 67 attached to the front end of the transmission shaft 66 engaging a bevel gear 68 mounted on a shaft perpendicular to the transmission shaft 66 and a gear train 69, to the input shaft of the reduction gear 34. The output shaft 34a of the reduction gear 34 rotates for the A-axis rotation at the second output rotating speed lower than the input rotating speed of the reduction gear 34. The output shaft 34a of the reduction gear 34 and the robot arm 40 are engaged by a ball-and-spline mechanism consisting of ball-splines 70 cut in the output shaft 34a and a ball-and-spline nut 71 fixed to the rear end 40a of the robot arm 40, to transmit the A-axis rotation of the output shaft 34a to the robot arm 40. The ball-splines 70 and the ball-and-spline nut 71 enable the robot arm 40 to be moved linearly by the pneumatic cylinder actuator 48.

Referring again to FIG. 1, when the base 26 of the industrial robot 20 is fixed to the bed of the machine tool, i.e., the lathe, the robot hand unit 42 attached to the extremity of the robot arm 40 suspended in a pendulum fashion is located at a workpiece handling position in front of the chucking device 10 of the lathe.

When the industrial robot 20 is held in an inoperative state, where the industrial robot 20 need not be operated for attaching a workpiece to the chucking device 10 and for removing a workpiece from the chucking device 10, the robot arm 40 and the robot hand unit 42 can be retracted from the workpiece handling position to a standby position away from the workpiece handling position, by turning the robot shoulder 32 for the B-axis rotation.

When the robot shoulder 32 is turned similarly for the B-axis rotation, to locate the robot arm 40 and the robot hand unit 42 having the robot hands 44 and 46 at the workpiece handling position in front of the chucking device 10 as shown in FIG. 1, the industrial robot 20 is able to operate in the following manner for attaching a workpiece to and removing a workpiece from the chucking device 10.

Data representing a position to which the robot arm set on standby at a predetermined position in front of the chucking device 10 is to be turned in a vertical plane by turning the output shaft 34a for the A-axis rotation to locate the robot hand 44 or 46 at a workpiece handling position where the axis of the robot hand 44 or 46 is aligned with that of the chucking device 10, is prestored in the robot controller 60. Assuming, for example, that the robot hand 44 is used for removing a workpiece from the chucking device 10 and the robot hand 46 is used for attaching a workpiece to the chucking device 10, then either the robot hand 44 or the robot hand 46 can be located at the work piece handling position. After thus locating the robot hand 44 or 46 at the workpiece handling position, the pneumatic cylinder actuator 48 is actuated to move the robot hand 44 or 46 linearly toward the chucking device 10 along an axis Z (FIG. 1), to transfer a workpiece to or to receive a workpiece from the chucking device 10, and to move the robot hand 44 or 46 linearly away from the chucking device 10 along the axis Z after transferring a workpiece to or receiving a workpiece from the chucking device 10.

If the robot hands 44 and 46 of the robot hand unit 42 attached to the extremity of the robot arm 40 are assigned, respectively, to the workpiece attaching operation and workpiece removing operation as mentioned above, the desired robot hand 44 or 46 can be accurately located at the workpiece handling position in front of the chucking device 10 by turning the robot hands 44 and 46 in the vertical plane about the axis A. Thus, a work handling operation for removing a machined workpiece from the chucking device 10 and attaching a workpiece to the chucking device 10 can be achieved in a short time by three actions, i.e., a rotational action about the axis A, a rotational action about the axis B, and a linear action along the axis Z.

When the robot arm 40 has a construction that enables another arm to be attached to and separated from an existing arm, the robot hands 44 and 46 can be positioned at the workpiece handling position in front of the chucking device 10 by adjusting the length of the robot arm 40 according to the corresponding size of the machine tool. Note, the robot hands 44 and 46 are not limited to the three-jaw type but may be any other suitable type.

It is obvious that the industrial robot of the present invention for attaching a workpiece to and removing a workpiece from the chucking device of a machine tool carries out a desired work handling procedure according to a control program including instructions signifying operations to be carried out at the workpiece handling position by the plurality of robot hands mounted on the extremity of the robot arm in connection with the chucking device, prestored in the robot controller 60 by teaching.

As apparent from the foregoing description, the industrial robot according to the present invention is provided with the robot hands for gripping a workpiece, which can be moved by turning between the two separate positions, i.e., the workpiece handling position where the robot hand attaches and feeds a workpiece to the chucking device of the machine tool, removes a workpiece from the chucking device and transports a workpiece, and the standby position, can be moved about an axis in a plane to align a workpiece with the chucking device of the machine tool and can be linearly moved toward and away from the chucking device to attach a workpiece to and to remove a workpiece from the chucking device, and is capable of being readily attached to the bed of the machine tool by a fixing means such as bolts. Thus, the industrial robot of the present invention has a compact construction, while exhibiting an excellent workpiece handling ability, and is capable of being used in combination with machine tools of different sizes.

We claim:

1. An industrial robot provided with a workpiece handling means for attaching a workpiece to and removing a workpiece from a chucking device of a machine tool according to instructions prestored by teaching in a robot controller, said robot comprising:
   a robot body means including a casing provided with a base means to be attached to a predetermined part of said machine tool, and two built-in rotation drive means;
   a first rotational output shaft projecting from the robot body means and connected to one of said two rotation drive means;
   a rotational transmission shaft connected to the other rotation drive means and extended through said first rotational output shaft;
   a second rotational output shaft interlocked with said rotational transmission shaft by a gear mechanism and extended perpendicularly to said first rotational output shaft;
   a robot shoulder means holding said second rotational output shaft, connected to said first rotational output shaft and capable of stopping at a predetermined workpiece handling position, a standby position away from said workpiece handling position, and an optional position between said workpiece handling position and said standby position;
   a suspended robot arm means having a base end connected to said second rotational output shaft to be able to move linearly in a predetermined range along an axis of said second rotational output shaft within said robot shoulder means; and
   a plurality of workpiece gripping robot hand means attached to a front end of said robot arm means, and capable of being alternately located at a position opposite to said chucking device of said machine tool by a rotational action of said second rotational output shaft when said robot shoulder means is located at said workpiece handling position.

2. An industrial robot according to claim 1, wherein said two rotation drive means comprises two servomotors disposed in parallel arrangement within said robot body means, said first and second rotational output shafts being included in the same horizontal plane, said robot shoulder means is provided internally with an actuator means capable of linearly moving said robot arm joined to said second rotational output shaft to be suspended like a pendulum along the axis of said second rotational output shaft to a predetermined position.

3. An industrial robot according to claim 2, wherein said actuator means comprises a pneumatic cylinder actuator.

4. An industrial robot according to claim 1, wherein said plurality of robot hand means are a robot hand for removing a workpiece from the chucking device of the machine tool and a robot hand for attaching a workpiece to said chucking device of said machine tool.

* * * * *